(12) United States Patent
Gaucher et al.

(10) Patent No.: US 8,089,006 B2
(45) Date of Patent: Jan. 3, 2012

(54) HIGH PERFORMANCE RESONANT ELEMENT

(75) Inventors: Brian P. Gaucher, Brookfield, CT (US);
Young Hoon Kwark, Chappaqua, NY (US); Christian Schuster, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1284 days.

(21) Appl. No.: 11/450,583

(22) Filed: Jun. 12, 2006

(65) Prior Publication Data

US 2007/0286293 A1 Dec. 13, 2007

(51) Int. Cl.
*H05K 1/11* (2006.01)

(52) U.S. Cl. ............ 174/262; 333/12; 333/227; 333/248

(58) Field of Classification Search .................. 375/242; 327/551; 174/262–266; 333/248, 137, 227
See application file for complete search history.

(56) References Cited

U.S. PATENT DOCUMENTS

| | | | | |
|---|---|---|---|---|
| 4,439,747 A * | 3/1984 | Kreinheder et al. | .......... | 333/208 |
| 5,966,058 A * | 10/1999 | Davidovitz | .................... | 333/121 |
| 6,300,578 B1 * | 10/2001 | Hoffmeyer et al. | .......... | 174/263 |
| 6,661,092 B2 * | 12/2003 | Shibata et al. | ................ | 257/724 |
| 7,310,508 B2 * | 12/2007 | Wu | ................ | 455/333 |
| 7,403,085 B2 * | 7/2008 | Fukunaga et al. | ............ | 333/208 |
| 2006/0083202 A1 * | 4/2006 | Kent et al. | ..................... | 370/334 |

* cited by examiner

*Primary Examiner* — Yuriy Semenenko
*Assistant Examiner* — Andargie M Aychillhum
(74) *Attorney, Agent, or Firm* — McGinn IP Law Group, PLLC

(57) ABSTRACT

A circuit includes an input signal line, a high performance resonant element connected to the input signal line, and an output signal line connected to the high performance resonant element. The high performance resonant element is a via.

19 Claims, 9 Drawing Sheets

HIGH PERFORMANCE RESONANT ELEMENT

This invention was made with Government support under Contract No.: H98230-04-C-0920 awarded by the National Security Agency. The Government has certain rights in this invention.

BACKGROUND OF THE INVENTION

1. Field of the Invention

The present invention generally relates to a high performance resonant element. In particular, the present invention relates to methods and systems for processing a signal using a high performance resonant via.

2. Description of the Related Art

Signal lines and vias are both ubiquitous in circuit board and chip package technology. A signal line is capable of transmitting a broadband signal with high fidelity, while a via is necessary to connect signal lines that may reside on different levels within a laminated circuit board or to bring a signal from a signal line embedded between layers of a circuit board to the surface of the circuit board.

A via may be formed by drilling a hole completely through a circuit board and then plating the interior of the hole with a conductive material. In this manner, a via may form a hollow, conductive barrel-shape.

A via may be used to connect a signal line within a laminated stack of patterned layers within a circuit board to another signal line within the circuit board. FIG. 1 is a cross-sectional view of a circuit board 100 having plane layers 102, a pair of dielectric layers 104, and a signal line (signal trace) 106 between the pair of dielectric layers 104.

FIGS. 2A and 2b provide cross-sectional views of two other circuit boards 200 and 202 to illustrate two different types of vias and their relationships to signal lines that may be distributed across multiple levels within a circuit board.

FIG. 2A illustrates a through-type via 204. A through-type via 204 receives a signal from a signal line 206 at one level of the circuit board 200, carries that signal across substantially the entire length of the via 204, and provides the signal to another signal line 208 at another level in the circuit board 200.

Electrically a through-type via is the most benign type of via. In other words, a through-type of via generally has the least amount of detrimental effect upon a signal in comparison with other types of vias.

FIG. 2B illustrates a stub type of via 210. The stub via 210 receives a signal from a signal line 212 at one level in the circuit board 202 and provides that signal to another signal line 214 at substantially the same level within the circuit board 202.

One characteristic of a stub type of via is that there is a long section of via (hence the "stub" moniker), which is not necessary for propagating the signal. However, a stub via is generally unavoidable because of manufacturing cost constraints.

Stub vias are conventionally viewed as having very adverse effects upon signal propagation. Therefore, circuit designers conventionally further process these signals to address the adverse effects that these vias have upon the signal being transmitted. If it is not feasible to do so then, the signal impairments introduced by the stub vias may restrict the frequency content of the signal that can be transmitted. This often leads to a reduction in the signal bandwidth that the connection can support.

In particular, as illustrated in FIG. 2B, when a signal enters a stub via, the signal splits into two paths. One of those paths goes directly from the input signal line 212 to the output signal line 214. However, the other path entails a portion of the signal traversing the full length of the via 210, reflecting from the other end of the via, traversing back along the full length of the via, and then splitting a second time. One portion of that reflected signal returns to the input signal line 212 and the other portion of the reflected signal is carried onto the output signal line 214.

The portion of the reflected signal that is carried onto the output signal line 214 represents a delayed and attenuated replica of the original incident signal and will serve to contaminate subsequent signals traveling down line 214. Such effects may be particularly disadvantageous to a sinusoidal signal, and if the transit time, down and back from the end of the stub via is substantially equal to one-half of the period of the sinusoidal signal, then phase cancellation of the signal may completely attenuate the signal received from the input signal line 212.

Another type of via called is a "buried-type" of via (not shown) which does not extend to one of the outer layers of a circuit board. However, while it is possible to construct a buried-type of via, these types of vias require that holes be drilled in patterned layers before the layers are laminated together to form a circuit. This is a much more expensive process than drilling the holes after laminating the entire circuit board. Therefore, buried-type vias are not preferred.

Yet another type of via, called a "blind" via extends to one surface of the board and terminates on one of the internal layers of the circuit board. A blind via can be used to circumvent a via stub effect as well. However, a blind via also suffers from higher fabrication costs, and due to processing limitations, usually can only access layers close to one of the circuit board surfaces.

SUMMARY OF THE INVENTION

In view of the foregoing and other exemplary problems, drawbacks, and disadvantages of the conventional methods and structures, an exemplary feature of the present invention is to provide a method and system for processing a signal using a via.

In a first exemplary aspect of the present invention, a system for processing a signal includes an input signal line, a high performance resonant element connected to the input signal line, and an output signal line connected to the high performance resonant element. The high performance resonant element is at least one via.

The inventors discovered that the characteristics of vias may be viewed as an advantage, rather than as problems to be overcome as has conventionally been done.

An exemplary embodiment of the present invention provides a via that may act as a relatively high performance resonant element that may be advantageously used for a large number of applications.

Conventionally, the characteristics of these vias may be selected such that losses are minimized. In stark contrast, in accordance with the present invention an exemplary embodiment takes advantage of the characteristics of a via by relying upon the via to process a signal. Since the incremental costs of vias in circuit boards are small, there is little impact to the overall cost of the finished assembly. The signal processing afforded by these structures may be adequate to allow dedicated components to be entirely replaced with significant cost savings.

BRIEF DESCRIPTION OF THE DRAWINGS

The foregoing and other exemplary purposes, aspects and advantages will be better understood from the following detailed description of exemplary embodiments of the invention with reference to the drawings, in which.

DETAILED DESCRIPTION OF EXEMPLARY EMBODIMENTS OF THE INVENTION

Figure 1:
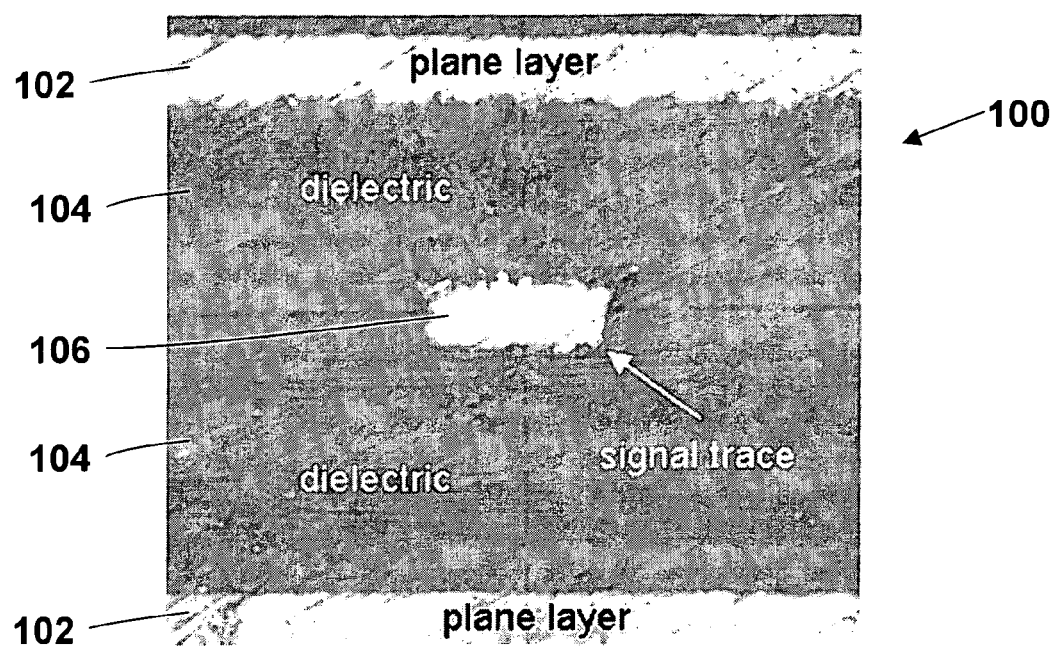
FIG. 1 illustrates a cross-sectional view of a circuit board 100.
Figure 2A:
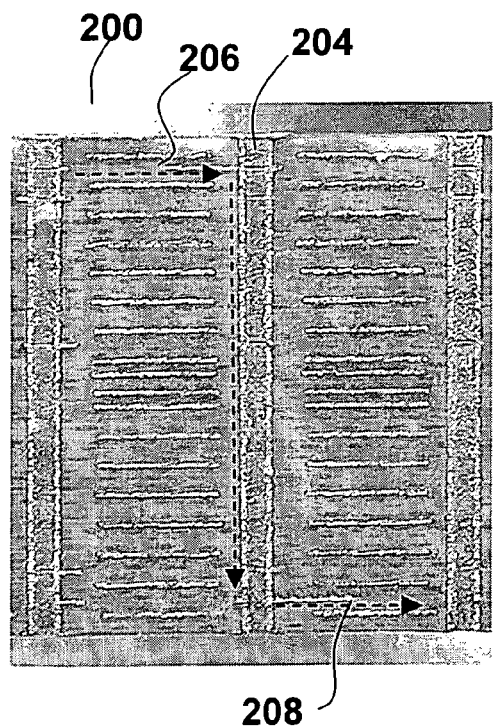
FIG. 2A is a cross-sectional view of a circuit board 200 with a through-type of via 204.
Figure 2B:
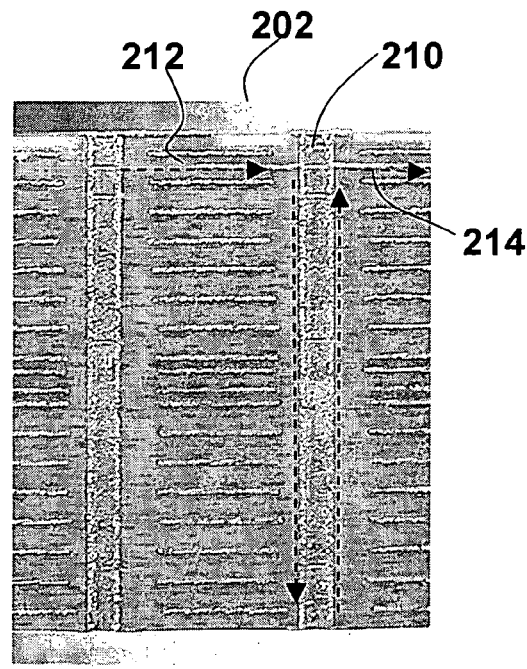
FIG. 2B is a cross-sectional view of a circuit board 202 with a stub via 210.

Referring now to the drawings, and more particularly to FIGS. 1-9, there are shown exemplary embodiments of the methods and systems of the present invention.

Stub vias may be classified into two types: an open stub via and a shorted stub via. An open stub via has an end, which is distally located with respect to associated signal lines and which is not connected to any other conductor. In contrast, a shorted stub via has an end, which is distally located with respect to the associated signal lines, and which is connected to a ground.

Figure 3A:
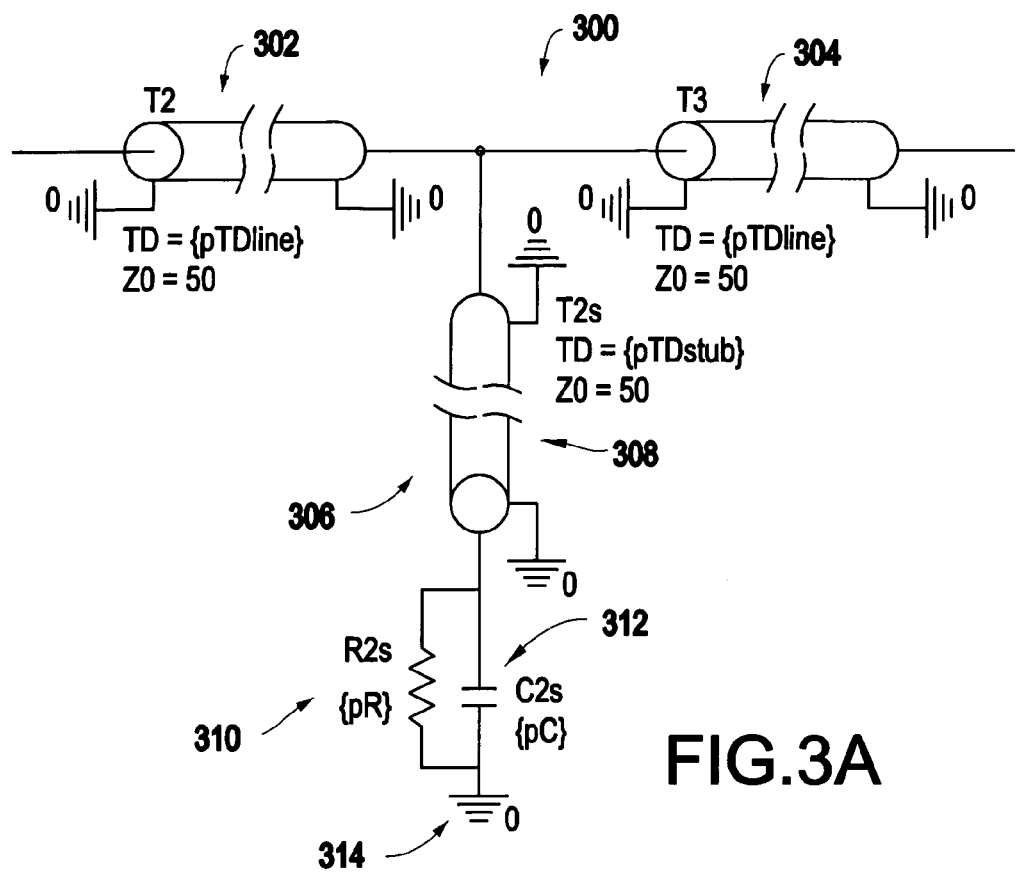
FIG. 3A is a model of one exemplary embodiment of the present invention.

Propagation of a signal within a via segment, is often modeled as a propagation down a transmission line, which, in general possesses a different impedance from "real" signal lines. FIG. 3A illustrates a model 300 for a shorted-type via, and FIG. 3B illustrates a plot of a frequency response of the model of FIG. 3A.

The model 300 includes an input signal line 302, an output signal line 304, and a shorted-type via 306. The via portion of the model includes an impedance element 308 in series with a resistor 310 and a capacitor 312, which are parallel to each other and are connected to a ground 314.

While FIG. 3A illustrates a model 300 with specific elements, one of ordinary skill in the art understands that there are many degrees of freedom for forming a via, such as, for example, the drill diameter, the type of conductive material, the length, and the like. Therefore, one of ordinary skill in the art understands that the elements which may be used to model the signal processing characteristics of a via may be varied in accordance with the desired accuracy of the model and the resulting complexity of the model.

Figure 3B:
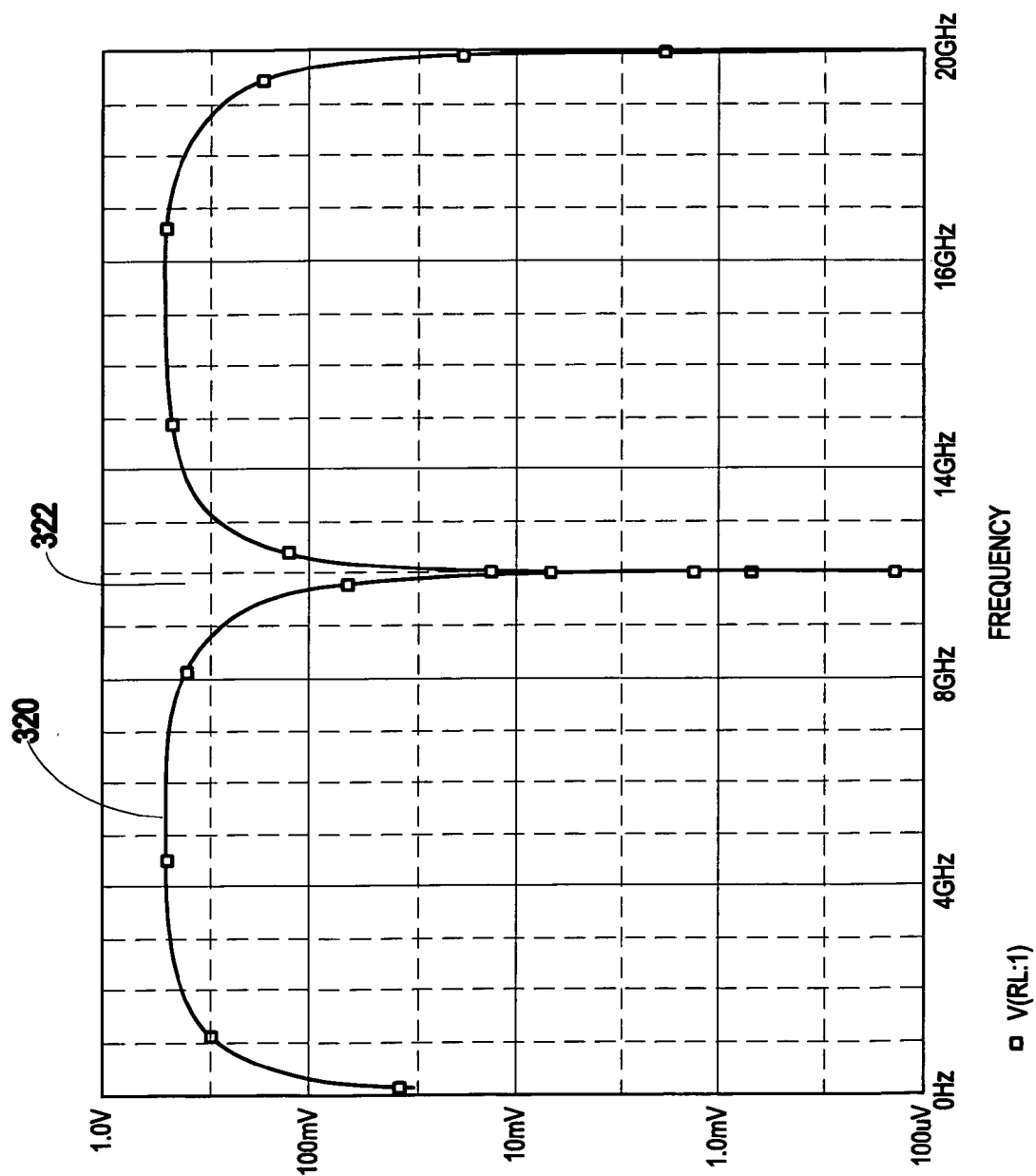
FIG. 3B is a plot of a frequency response for the embodiment of FIG. 3A.

FIG. 3B is a plot of the frequency response of the model 300 of FIG. 3A. The plot of FIG. 3B illustrates the transmission of a signal of varying frequencies through the shorted-type of via 306. To model a shorted-type of via, the resistance of the resistor 310 is set to a resistance of zero ohms. Therefore, as illustrated in FIG. 3B, since the via 306 is shorted to ground 314, no direct current signal may pass through the model 300.

FIG. 3B illustrates that, as the frequency of the input signal is increased, because of the phase-delay between ground 314 and the input signal line 302, the ground 314 will not appear to be a ground at the junction of the two signal lines 302 and 304. For the plot of FIG. 3B, at approximately five or six gigahertz 320, the via 306 passes substantially all of the signal.

However, at a frequency of approximately 10 gigahertz 322, the via 306 again acts as a short. Therefore, the frequency response of the shorted-type via 306 exhibits a periodicity alternating between a short and an open at the junction of 302 and 304 because of the round trip transit time across the via.

In another exemplary embodiment of the present invention, the characteristics of the via 306 may be modeled with a resistor 310 that is assigned a value other than zero. If this value is much greater than the characteristic impedance of the signal lines (strip lines) 302, 304 and the via barrel 308, the model 300 more accurately reflects the characteristics of an open stub via 306.

In that instance, a direct current signal may pass directly through the model 300 substantially un-attenuated. Indeed, the higher the resistance of the resistor 310, a greater fraction of a low frequency signal will pass from the input signal line 302 to the output signal 304 without being affected by the via 306. However, for increasing frequencies, the open stub configuration will eventually present a short to the junction of striplines 302 and 304. This will occur first at the quarter-wave stub frequency when the phase due to the round trip delay traversing 308 will add up to 180 degrees and lead to phase cancellation of the incoming signal. This will also occur at odd harmonics of this frequency.

Therefore, an open stub via generally exhibits characteristics, which are complementary to a shorted stub via. For a direct current signal, an open stub via generally allows the signal to pass un-attenuated, while a shorted stub via would attenuate substantially all of the direct current signal. Therefore, a open stub via acts like a low-pass filter while the shorted stub via acts like a high-pass filter.

Therefore, a single via has a frequency response that includes a single notch at one frequency that repeats across harmonics of that frequency and which has a very high "Q" factor.

In another exemplary embodiment of the present invention, several vias may be coupled together to provide an interacting ensemble of tightly coupled high Q resonators.

Figure 4A:
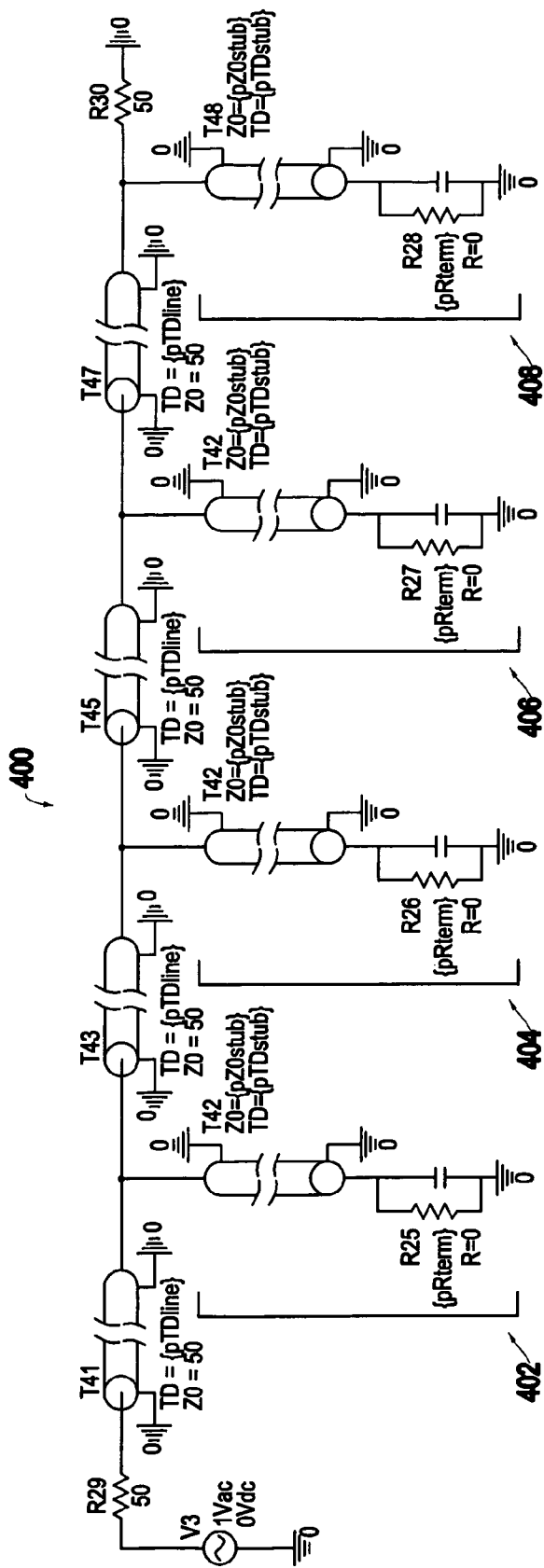
FIG. 4A is a model of another exemplary embodiment of the present invention.
Figure 4B:
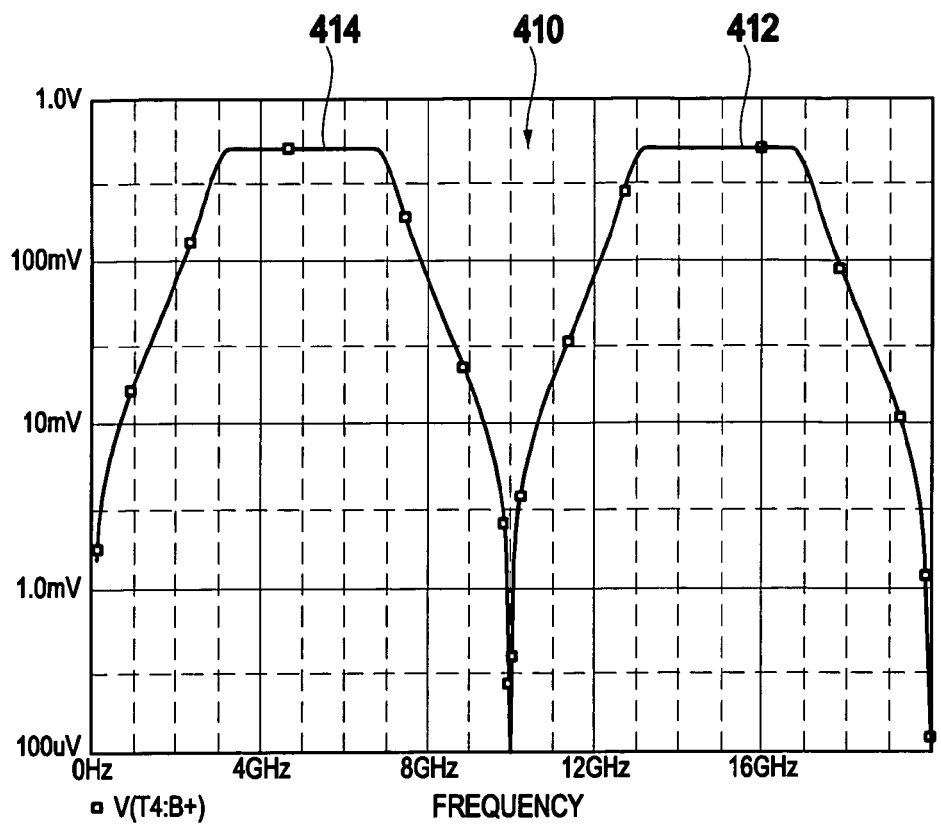
FIG. 4B is a plot of a frequency response for the embodiment of FIG. 4A.

Referring now to FIGS. 4A and 4B, another exemplary embodiment of the present invention is illustrated. FIG. 4A schematically illustrates a circuit 400 that has four shorted-type vias 402, 404, 406, and 408. The collective behavior of these four shorted-type vias 402, 404, 406, and 408 provides a frequency response that is illustrated by the plot of FIG. 4B. This exemplary embodiment illustrates characteristics, which are desirable, for example, for use as a band-pass filter having a pass-band 414. The broadening of a sharp reject notch into a stop band 410 is due to the interaction of the resonances between the vias 402, 404, 406, and 408.

Note that the frequency response of FIG. 4B has a periodicity with a second passband 412 centered at 15 GHz. This second band 412 is usually significantly attenuated due to losses in the structure, but may pass sufficient energy that an additional roofing filter may be needed depending on the application as understood by those of ordinary skill in the art.

Comparing the frequency responses of FIGS. 4B and 3B, the rejection band 410 of FIG. 4B is wider than the rejection band 302 of FIG. 3B. Also, the pass band 414 of FIG. 4B is flatter than the pass band 304 of FIG. 3B.

Figure 5:
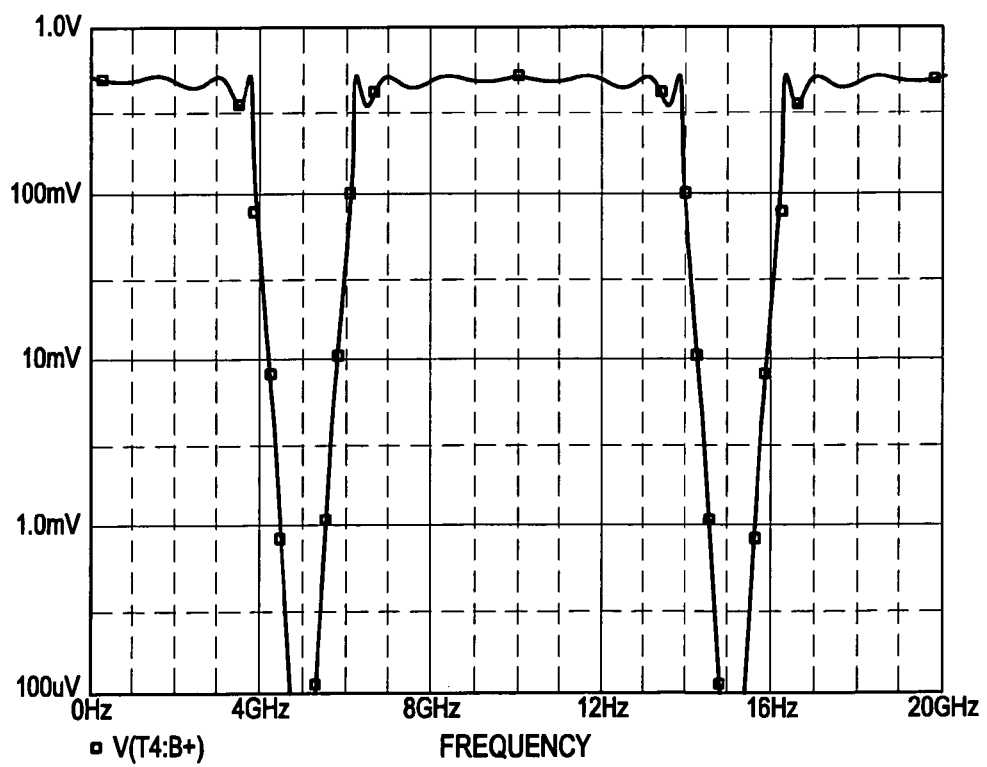
FIG. 5 is a plot of a frequency response for yet another exemplary embodiment of the present invention.

FIG. 5 illustrates a plot of a frequency response for another exemplary embodiment of the present invention that includes four stub vias (not shown). In comparison with FIG. 4B, the frequency response of FIG. 5 exhibits substantially complementary characteristics. In other words, the frequency response of this exemplary embodiment exhibits low-pass filter characteristics.

These exemplary embodiments might not exhibit perfect band-pass characteristics because each of these embodiments will exhibit image characteristics. These band-pass filters may pass and/or reject all frequencies, which are harmonically related. Therefore, one of ordinary skill in the art understands that additional filtering may be advantageous to process the images according to the specific applications.

In another exemplary embodiment of the present invention, the capacitance of a via may be controlled, by, for example, connecting one end of a varactor having a voltage tunable capacitance to an open end of the via and the other end of the varactor to a ground. A varactor is advantageous because it may be electronically tuned and, therefore, may provide an adaptive filter capacity. In this manner, by tuning the capacitance, the frequencies at which the reject/pass bands occur may be adjusted. The response to such adjustments of a frequency response for an exemplary embodiment, which includes stub vias is illustrated by FIG. 6.

Alternatively, the tunable capacitance may be implemented as laser trimmable components or copper patterns on the circuit board itself, in which case, a trimming operation can be performed as a part of a test sequence.

Figure 6:
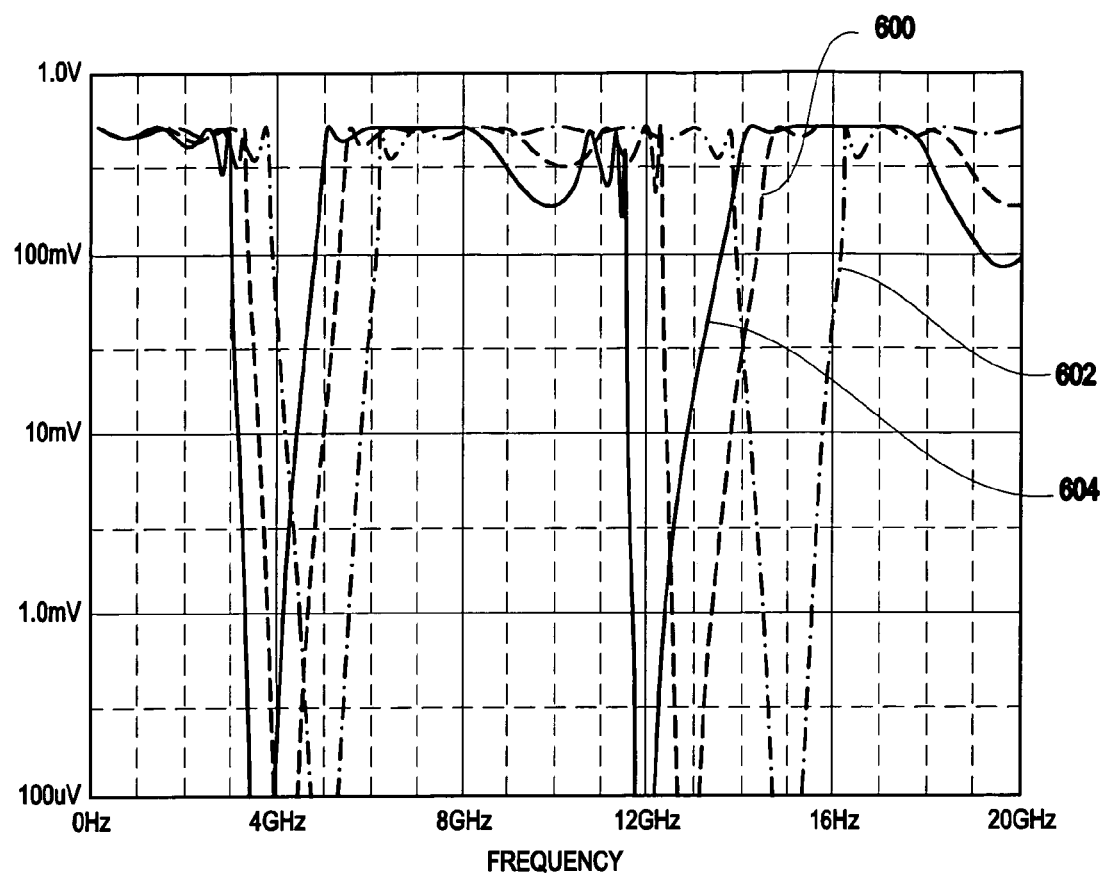
FIG. 6 is a plot of three frequency responses for three additional exemplary embodiments of the present invention.

FIG. 6 includes a first plot 600 of a frequency response for a plurality of stub vias having no added capacitance, a second plot 602 of a frequency response for a plurality of stub vias each having a capacitance of 0.2 pF, and a third plot 604 of a frequency response for a plurality of stub vias each having a capacitance of 0.4 pF. As is clearly illustrated by FIG. 6, the pass/reject bands of each of the frequency responses may be adjusted by adjusting the capacitance. For example, varactors added to the via stub terminus can provide a variable capacitance by adjusting a direct current bias. In this manner, an exemplary embodiment of the present invention is capable of tuning the position of pass/reject bands on a frequency spectrum if the fundamental operation for the circuit requires tuning or if it is desired to tune the frequencies to improve yield.

A via acting as a band pass filter to reject cross-talk in accordance with an exemplary embodiment of the present invention may be particularly useful in radio frequency applications. For example, a radio frequency device may have a very powerful narrow band jammer with a transmitter transmitting at a specific frequency band. By providing a via in accordance with an exemplary embodiment of the present invention, which includes characteristics of a band-pass filter having a notch, which corresponds to the specific frequency band, then the via may provide significant rejection (attenuation) of that signal and may prevent that signal from progressing into the signal lines.

Alternatively, in another exemplary embodiment of the present invention, a narrow band pass filter may be provided. A narrow band pass filter may be quite useful for clock lines where it is desired to distribute a clock signal which only has a single frequency component and where it is desired to reject any other noise which becomes coupled with the signal. This may prevent extraneous noise from coupling into the clock line, which would otherwise contaminate the clock signal and result in increased phase noise.

Vias that are placed in close proximity to each other within a circuit board may also transfer significant amounts of energy to each other. An exemplary embodiment of the present invention may rely upon this coupling to form the basis of band limited couplers in which two transmission lines, each with a periodic array of via stubs, are placed in close proximity as described below. In order to help confine energy to the coupler structure, it may be desirable to surround the structure with a fence of grounded vias.

Figure 7:
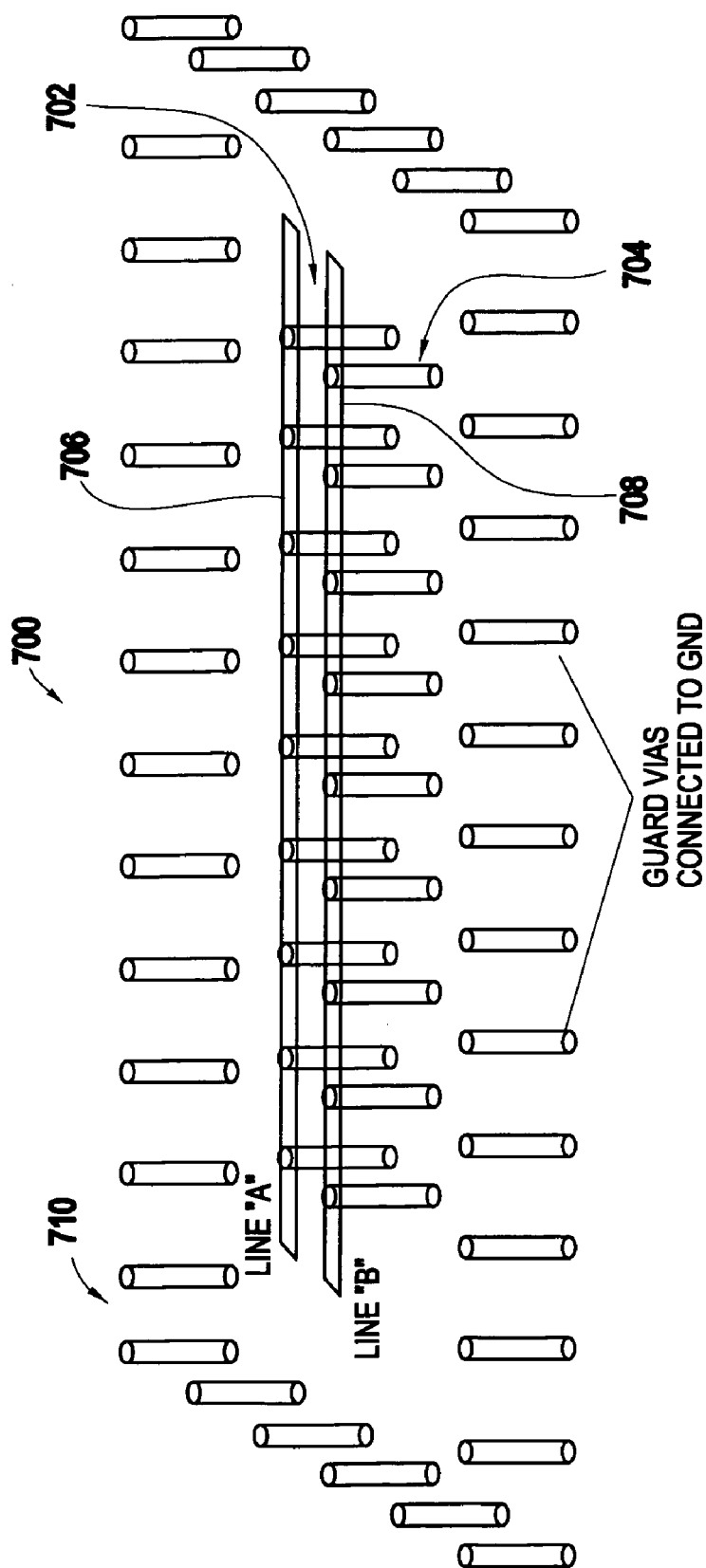
FIG. 7 illustrates a coupler structure 700 in accordance with an exemplary embodiment of the present invention.

FIG. 7 illustrates an exemplary embodiment of the present invention that may be useful as a coupler structure 700. This exemplary embodiment of the present invention includes two arrays of vias 702 and 704 in close proximity to each. Each array of vias 702 and 704 is connected to a signal line 706 and 708, respectively. In this exemplary embodiment 700, the energy between the lines 706 and 708 are coupled because, at a high enough frequency, the energy which traverses along each via of each array of vias 702 and 704, no longer stays within the via. Rather, the energy received by one of the array of vias 702 or 704 may be transmitted to the other one of the array of vias 704 or 702, respectively. Above a certain frequency, each via acts like an antenna, which propagates energy into adjacent vias. In this manner, energy may be transferred from one array of vias 702 or 704 to another array of vias 704 or 702, respectively.

Coupler structures similar to the exemplary embodiment of FIG. 7 may be used in, for example, radio frequency (RF) applications.

FIG. 7 also illustrates that this exemplary embodiment 700 includes an array of "guard" vias 710 which may surround the coupler via arrays 702 and 704 and be connected to a ground (not shown) and, which, therefore, absorb energy and prevent energy from escaping from the coupler 700. In this manner, the guard vias 710 may protect other circuits (not shown) from having their signals corrupted by noise from the coupler 700. In addition, confining the energy to the vicinity of the coupled via arrays will increase the coupling and selectivity of the coupler structure. This is due to the creation of standing wave patterns produced by coherent scattering by the array of guard vias. These standing wave patterns also present an opportunity to introduce additional frequency selectivity by placing the coupler via arrays at appropriate nodes and antinodes within the standing wave patterns.

The via arrays comprising the coupler structure can be tuned using the techniques presented in FIG. 6 to adaptively control the frequency over which coupling is significant as well as its strength. Such tuneability can be used to advantage in many signal processing applications.

Figure 8:
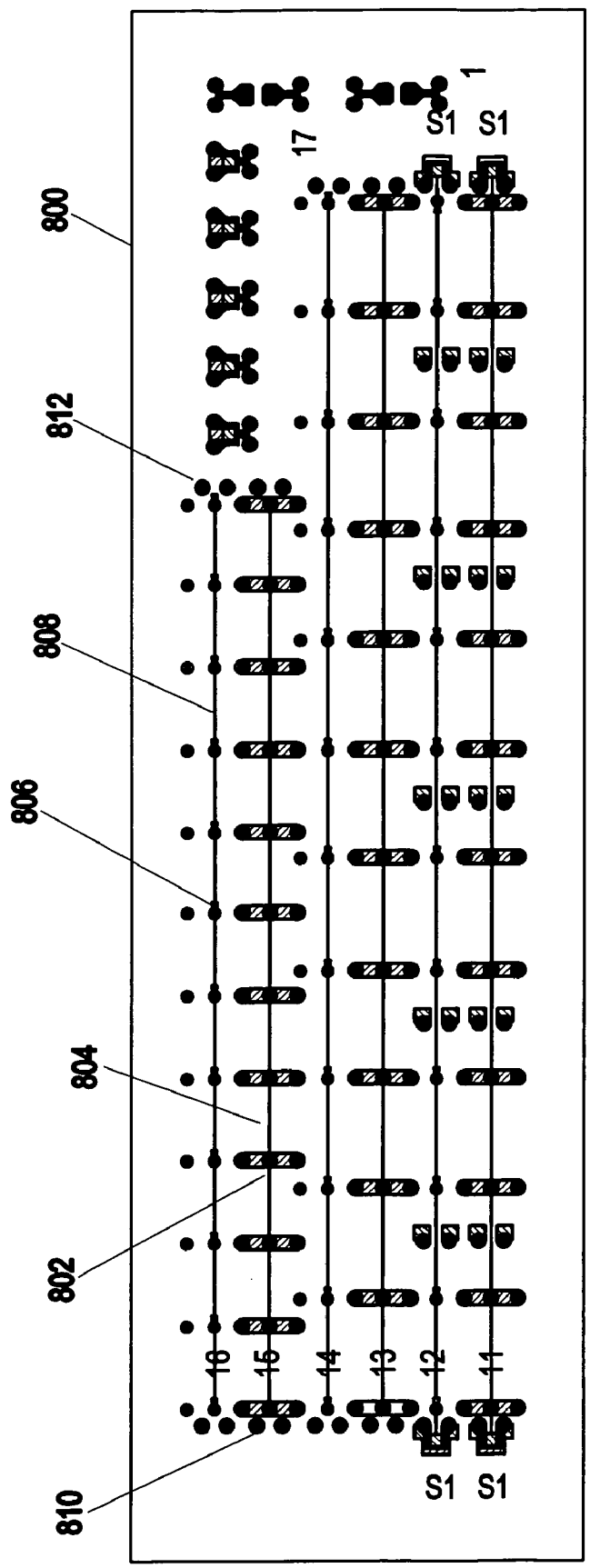
FIG. 8 illustrates a plan view of a circuit board in accordance with an exemplary embodiment of the present invention.

FIG. 8 is a plan view of a circuit board 800 that includes two more exemplary embodiments of the present invention. One of the exemplary embodiments of FIG. 8 includes shorted-type vias 802 connected to each other by a signal line 804 and the other exemplary embodiment includes stub vias 806 connected to each other by a signal line 808. At the end of each of the signal lines 804 and 808, is a U-shaped launch structure, 810 and 812, respectively.

Figure 9:
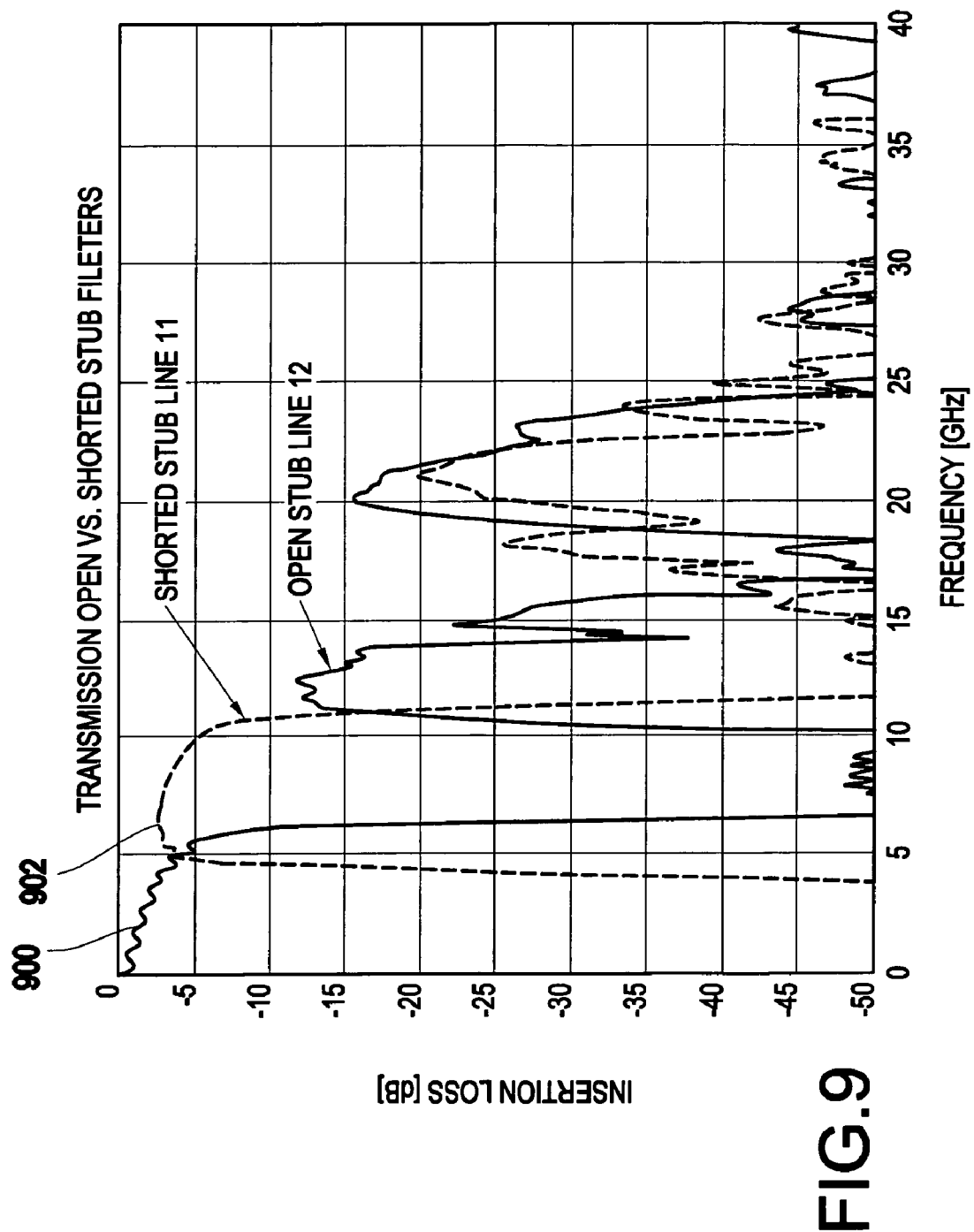
FIG. 9 illustrates the frequency responses for the two circuit devices in the circuit board of FIG. 8.

FIG. 9 illustrates the frequency responses for each of the exemplary embodiments incorporated into the circuit board of FIG. 8. As is clearly illustrated, the frequency response 900 of the open stub via embodiment shows that at low-frequencies, an input signal is passed through the circuit, while at around five to six gigahertz the signal is significantly attenuated and, indeed, exhibits very good rejection of that band of frequencies. The frequency response 900 exhibits and image passband at about twelve gigahertz, but is attenuated by twelve decibels. One of ordinary skill in the art would understand that frequencies above about twelve gigahertz may require further filtering depending upon the particular application. Additional filtering may be needed if the image passbands allow undesired spectral content of the signal to leak through. If such spectral energy is not significant in the signal, then such measures are not needed.

FIG. 9 further illustrates that the images (harmonics) of the frequency response at the higher frequencies do not reach the original value of signal strength. This is the result of the loss (or transmission) of energy away from the vias at the higher frequencies as well as from the losses in the transmission line.

The other frequency response 902 shown by FIG. 9 corresponds to the exemplary embodiment of FIG. 8 that has multiple shorted-type vias. This frequency response 902 illustrates the characteristics of a band-pass filter from about five to ten gigahertz. Similarly, the frequency response 902 exhibits excellent rejection at other frequencies and images (harmonics) having a reduced output.

In addition to the characteristics of the vias which may be controlled as discussed above, one of ordinary skill in the art understands that the signal processing characteristics of a via may be adjusted any number of different ways while still practicing the present invention. For example, the Z0 (impedance), length (through back milling or drilling), complex Z (pad and antipad geometries), and the like may be adjusted to tailor the response characteristics of a via in accordance with the present invention. For example, the diameter of the via in conjunction with the diameter of the antipads will influence the impedance of the via. Adjusting the overall length of the stub through backdrilling will affect the round trip delay in a direct fashion thereby providing a mechanism for scaling the frequencies of the passbands and stopbands. Further fine tuning of the via characterisitics can be exercised with the addition of pads on unused signal layers and also on the plane layers in the circuit board. In addition, the precise placement of GND vias located in close proximity can be varied to lend additional fine tuning to the frequency response.

Further, the spacing between vias and the number of vias in a cascade device may also be adjusted to tailor the response characteristic of the device in accordance with the present invention.

An exemplary embodiment of the present invention may also utilize the bandpass characteristics of a via to reject cross-talk for any given application. In such an application, if the characteristics of the via are selected such that the rejection band is centered around a strong clock frequency, be it the fundamental or a harmonic, cross-talk from that clock will be attenuated by the via and attenuated as it propagates along a signal line. If this signal line is used to carry data, then the eye opening at the receive end will be improved and the effect of the clock cross-talk will be mitigated.

Another exemplary embodiment of the present invention may select the features of a via such that the via serves as a narrow band pass filter which may be useful to distribute a clock signal. By selecting the characteristics of the via, the passband of the via may be tuned such that the passband is narrow and is centered at the fundamental clock frequency. In this manner, the via will selectively filter out noise from the clock signal.

If the interfering signal is broadband, as is usually the case, most of the cross-talk will be attenuated in accordance with this exemplary embodiment of the present invention.

Further, the frequency response of an array of vias may be adjusted based upon variations in the terminations of the vias, by, for example, connecting the vias to varactors, adjusting the length of the via during manufacturing, and the like.

While the invention has been described in terms of several exemplary embodiments, those skilled in the art will recognize that the invention can be practiced with modification.

Further, it is noted that, Applicant's intent is to encompass equivalents of all claim elements, even if amended later during prosecution.

What is claimed is:

1. A system for processing a signal, the system comprising:
   an input signal line;
   a high performance resonant element connected to said input signal line, the high performance resonant element comprising a via for receiving the signal from the input signal line, modifying a characteristic of the signal, and recombining an admixture of an original signal and modified components for downstream conveyance down the signal line while substantially maintaining its original mode of propagation; and
   an output signal line connected to said high performance resonant element and outputting the modified signal,
   wherein the input signal line comprises a first planar transmission line and the output signal line comprises a second planar transmission line, and the via is formed at a junction of the first and second planar transmission lines.

2. The system of claim 1, wherein said signal being processed by the system comprises a plurality of frequency components and the via attenuates a frequency component of the plurality of frequency components.

3. The system of claim 2, wherein said via affects said plurality of frequency components to provide a desired output signal.

4. The system of claim 3, wherein said via attenuates more than one of said plurality of frequency components.

5. The system of claim 4, wherein said frequency component of said plurality of frequencies comprises a noise frequency.

6. The system of claim 4, wherein said via permits a frequency component of said plurality of frequency components to pass.

7. The system of claim 1 wherein said high performance resonant element comprises a band-pass filter.

8. The system of claim 7, further comprising:
   a clock source providing a clock signal to said input signal line.

9. The system of claim 8, wherein said band-pass filter comprises a pass band that corresponds to a frequency of said clock signal.

10. The system of claim 7, wherein said band-pass filter comprises a reject band that corresponds to a frequency of a noise signal.

11. The system of claim 1, wherein said first planar transmission line and said second planar transmission line comprise a first transmission line in a coupler, and
    wherein said system further comprises:
    a first plurality of vias, including said via, connected to said first transmission line;
    a second transmission line; and
    a second plurality of vias connected to said second transmission line.

12. The system of claim 11, further comprising:
    a third plurality of vias forming an array surrounding said first plurality of vias and said second plurality of vias for shielding the first plurality of vias and the second plurality of vias, for reducing cross-talk, and for increasing an efficiency of coupling between the first plurality of vias and the second plurality of vias.

13. The system of claim 1, further comprising:
a second via connected to said output signal line.

14. The system of claim 1, wherein the via comprises a via for processing the signal, and the output signal line outputs the processed signal.

15. The system of claim 1, wherein the modified signal comprises a desired output signal, the via comprising at least one of a position, a length and a diameter which is configured for providing the desired output signal.

16. The system of claim 1, wherein the modified signal comprises a desired output signal and the via comprises a plurality of vias, and
wherein at least one of a spacing between the plurality of vias and a number of the plurality of vias is configured for providing the desired output signal.

17. A system for processing a signal, said system comprising:
means for affecting a signal using a via, the via receiving the signal from an input signal line, modifying a characteristic of the signal, and recombining an admixture of an original signal and modified components for downstream conveyance down the signal line while substantially maintaining its original mode of propagation; and
means for receiving said affected signal from said via, the via being connected to an output signal line for outputting the modified signal,
wherein the input signal line comprises a first planar transmission line and the output signal line comprises a second planar transmission line, and the via is formed at a junction of the first and second planar transmission lines.

18. The system of claim 17, wherein said via affects a plurality of frequency components of said signal to provide a desired output signal.

19. The system of claim 18, wherein said via attenuates the frequency component of said plurality of frequency components.

* * * * *